(12) United States Patent
Danteny et al.

(10) Patent No.: US 12,359,581 B2
(45) Date of Patent: Jul. 15, 2025

(54) TURBINE STATOR ASSEMBLY (71) Applicant: SAFRAN AIRCRAFT ENGINES, Paris (FR)

(72) Inventors: Ulysse Jacques Bernard Danteny, Moissy-Cramayel (FR); Kenny Beauboit, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/547,997

(22) PCT Filed: Mar. 4, 2022

(86) PCT No.: PCT/FR2022/050387
§ 371 (c)(1),
(2) Date: Aug. 25, 2023

(87) PCT Pub. No.: WO2022/189735
PCT Pub. Date: Sep. 15, 2022

(65) Prior Publication Data
US 2024/0026797 A1 Jan. 25, 2024

(30) Foreign Application Priority Data

Mar. 12, 2021 (FR) ..................................... 2102464

(51) Int. Cl.
*F01D 11/00* (2006.01)
*F01D 9/04* (2006.01)
(52) U.S. Cl.
CPC ............ *F01D 11/001* (2013.01); *F01D 9/041* (2013.01); *F05D 2220/323* (2013.01);
(Continued)

(58) Field of Classification Search
CPC .. F01D 11/001; F01D 9/041; F05D 2220/323; F05D 2230/54; F05D 2260/31; F05D 2300/171
See application file for complete search history.

(56) References Cited

U.S. PATENT DOCUMENTS 8,186,938 B2 * 5/2012 Young ..................... F01D 5/085
415/113
2011/0127352 A1 * 6/2011 Fachat .................. F01D 11/001
239/265.15
(Continued)

FOREIGN PATENT DOCUMENTS

DE 102012014109 A1 1/2014
EP 2594743 A1 5/2013
(Continued)

OTHER PUBLICATIONS

International Search Report received for PCT Patent Application No. PCT/FR2022/050387, mailed on Jun. 27, 2022, 8 pages (3 pages of English Translation and 5 pages of Original Document).

*Primary Examiner* — Courtney D Heinle
*Assistant Examiner* — Andrew J Marien
(74) *Attorney, Agent, or Firm* — Womble Bond Dickinson (US) LLP (57) ABSTRACT

The invention relates to a stator assembly for an aircraft turbomachine extending about an axis and including: a shroud ring, a plurality of bladed ring sectors, sliding assembly allowing relative movement between the shroud ring and each of the ring sectors, the sliding assembly including two outer annular flanges which are upstream and downstream of the shroud ring, respectively, and an inner flange of each of the ring sectors which is inserted axially between the two outer flanges, wherein each of the ring (Continued)

sectors includes a deflector which is supported by the inner flange of the sector and extends around the upstream annular flange of the shroud ring.

20 Claims, 9 Drawing Sheets

(52) U.S. Cl.
CPC ...... *F05D 2230/54* (2013.01); *F05D 2260/31* (2013.01); *F05D 2300/171* (2013.01)

(56) References Cited

U.S. PATENT DOCUMENTS

| | | | | |
|---|---|---|---|---|
| 2013/0045089 | A1* | 2/2013 | Bridges | F01D 11/005 415/173.7 |
| 2013/0189086 | A1* | 7/2013 | Bayer | F16J 15/444 415/173.1 |
| 2014/0105725 | A1* | 4/2014 | Stiehler | F01D 11/02 72/352 |
| 2014/0105732 | A1* | 4/2014 | Luneau | F01D 11/001 415/174.4 |
| 2014/0205442 | A1* | 7/2014 | Luneau | F01D 11/001 415/170.1 |
| 2014/0314550 | A1 | 10/2014 | Jenkinson et al. | |
| 2014/0363283 | A1* | 12/2014 | Guemmer | F01D 11/12 416/193 A |
| 2015/0275674 | A1* | 10/2015 | Alvarez Garcia | F01D 11/001 416/95 |
| 2018/0347384 | A1* | 12/2018 | Kislinger | F16J 15/444 |
| 2019/0136705 | A1* | 5/2019 | Schlemmer | F01D 11/003 |

FOREIGN PATENT DOCUMENTS

| | | |
|---|---|---|
| FR | 2999641 A1 | 6/2014 |
| FR | 3027343 A1 | 4/2016 |
| FR | 3039589 A1 | 2/2017 |
| FR | 3082233 A1 | 12/2019 |

* cited by examiner

TURBINE STATOR ASSEMBLY

TECHNICAL FIELD OF THE INVENTION

The present invention relates to the field of the aircraft turbomachines and in particular to a turbine stator assembly for an aircraft turbomachine.

TECHNICAL BACKGROUND

The technical background comprises the documents US-A1-2018/0347384, FR-A1-3 082 233 and FR-A1-3 039 589.

A conventional turbomachine turbine comprises one or more axial stages arranged in series to convert combustion energy into motive energy, in particular to drive a compressor rotor or rotors and a fan shaft.

To achieve this, each stage of the turbine comprises a dispenser forming a stator and a movable wheel forming a rotor. The dispenser comprises stationary vanes configured to accelerate and divert a flow of combustion gases towards movable vanes carried by a disc of the movable wheel.

It is known to place a seal radially inside the dispenser in order to reduce the circulation of the gases outside the primary annular vein in which the stationary and movables vanes extend. Such a seal comprises an abradable element secured to the dispenser and one or more annular lips secured to the rotor.

During operation of the turbomachine, the dispenser is exposed to higher temperatures than the disc of the movable wheel and the thermal inertia of the dispenser is generally lower than that of the disc, resulting in a variation in the clearance between the abradable element and the lips. The rotating of the rotor also deforms it, leading to variations in mechanical rotor/stator clearance, which vary according to the engine speed (clearance closing during the accelerations, clearance opening during the decelerations).

The result is an increase in the rate of leakage through the seal as the aforementioned clearance increases, and an acceleration of wear on the abradable element as this clearance decreases.

The document FR-A1-3 027 343 discloses a mounting solution allowing a radial movement between the abradable element and the dispenser. To allow this type of movement, a certain amount of mounting clearance is provided between the abradable element and the dispenser.

During operation, some of the hot gases from the vein, which are intended to circulate to the seal, enter this mounting clearance. Hot gases therefore circulate from upstream to downstream through the mounting clearance between the abradable element and the dispenser before being reinjected into the vein. These hot gases tend to increase the temperature of the abradable element and the dispenser, which can alter the operation of the seal and therefore impact the performance of the turbomachine, but also affect the service life of these parts. In practice, an increase in the temperature of the abradable element (and of the sealing annulus which supports this abradable element) leads to an undesired clearance opening due to thermal expansion.

The aim of the invention is to provide a solution to this problem of overheating while maintaining the leakage between the abradable element and the dispenser, which is inherent in the presence of the mounting clearance between these parts.

SUMMARY OF THE INVENTION

The invention relates to a stator assembly for an aircraft turbomachine extending around an axis and comprising:

a sealing annulus extending around the axis and comprising an abradable element intended to cooperate with sealing lips carried by a rotor mounted around the axis, a plurality of ring sectors arranged circumferentially end to end around the axis so as together to form a ring, each ring sector being bladed, sliding means allowing a relative movement radially with respect to the axis between the sealing annulus and each of the ring sectors, the sliding means comprising:

according to a first configuration, two external annular flanges, upstream and downstream respectively, of the sealing annulus, and an internal flange of each of the ring sectors which is interposed axially between the two external flanges, or according to a second configuration, two internal annular flanges, upstream and downstream respectively, of each of the ring sectors, and an external flange of the sealing annulus which is interposed axially between the two internal flanges, characterised in that each of the ring sectors comprises a deflector which is carried, according to the first configuration, by the internal flange of this sector and which extends around the upstream annular flange of the sealing annulus, and according to the second configuration, by the upstream flange.

In this application, "deflector" means a gas guide member. When a flow of gas encounters a deflector, this flow bypasses this deflector and changes its flow path.

In the present invention, the deflector allows to modify the flow of the gas flow which comes from the vein and flows radially inwards upstream of the ring sectors, to join the seal of which the sealing annulus forms part. This gas flow flows radially inwards along the internal flange of each of the ring sectors and encounters the deflector as it passes. The gas flow is then guided upstream by the deflector, allowing this flow to mix with the cooling air of the rotor. This mixture leads to a significant reduction in the temperature of the air circulating in the aforementioned mounting clearance between the sealing annulus and the ring sectors. The temperature of the sealing annulus is reduced, which allows to close the rotor/stator clearance (through a thermal expansion) and therefore improves the performance of the turbine.

The stator assembly according to the invention may comprise one or more of the following characteristics, taken in isolation from each other, or in combination with each other:

the deflector is attached to an upstream radial face of the internal annular flange of each of the ring sectors, the deflector is attached to the internal flange of each of the ring sectors by welding, brazing or riveting, the deflector is generally L-shaped in axial cross-section, a first branch of which is oriented radially and extends parallel to the internal flange of each of the ring sectors, and a second branch of which is oriented axially upstream and extends around the upstream annular flange of the sealing annulus and at least an upstream portion of this sealing annulus, said second branch comprises an upstream free end located upstream of the sealing annulus, the deflector is a first sheet-metal, the assembly comprises a second sheet-metal which forms a further deflector and which is carried by the upstream external flange of the sealing annulus, and/or a third sheet-metal which forms a further deflector and which is carried by the downstream external flange of the sealing annulus, the sliding means also comprise pins carried by the upstream and downstream external flanges of the sealing annulus and passing through oblong openings formed in the flange of each of the ring sectors, the internal flange of each of the ring sectors has a radial dimension greater than a maximum radial dimension of the sealing annulus, the internal flange of each of the ring sectors is engaged between the flanges of the sealing annulus over a radial distance which represents less than 50% of the maximum radial dimension of the ring sectors, the external flange of the sealing annulus is engaged between the flanges of each of the ring sectors over a radial distance that is less than 50% of the maximum radial dimension of the ring sectors, the upstream flange of each of the ring sectors carries said deflector at its internal periphery, and the sliding means also comprise pins carried by the upstream and downstream flanges of each of the ring sectors and passing through oblong openings formed in the flange of the sealing annulus, said deflector being located radially inside these pins.

The present invention also relates to a turbine for an aircraft turbomachine, the turbine comprising a casing and a stator assembly as described above carried by the casing.

The stator turbine according to the invention may comprise one or more of the following characteristics, taken in isolation from each other, or in combination with each other:

the turbine further comprises a rotor provided with annular lips configured to cooperate with the abradable element of the stator assembly, this rotor comprising a movable wheel located upstream of the ring sectors and comprising a disc carrying vanes, the vanes of the movable wheel comprise downstream spoilers which extend at least partly around said deflector, the rotor comprises a first ventilation air passage which has an axial orientation and is defined by clearances between roots of the vanes and the disc, and a second ventilation air passage which has a radial orientation and is defined by radial orifices formed upstream of said lips, and the downstream spoilers extend around said deflector, which in turn extends around the other deflector carried by the upstream external flange of the sealing annulus.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

The figures comprise a reference frame L, R and C defining respectively axial (or longitudinal), radial and circumferential directions that are orthogonal to each other.

Figure 1:
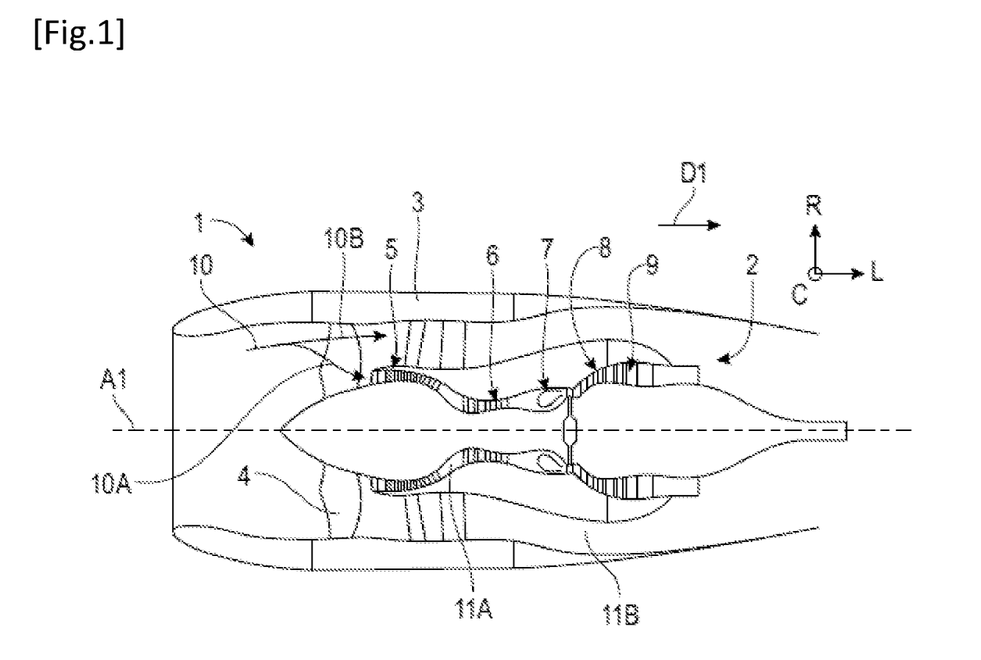
FIG. 1 is a schematic axial sectional view of an aircraft propulsion assembly.

FIG. 1 shows an aircraft propulsion assembly 1 comprising a turbomachine 2 shrouded in a nacelle 3. In this example, the turbomachine 2 is a turbomachine of the double-body and double-flow turbofan type.

Hereafter, the terms "upstream" and "downstream" are defined in relation to a direction D1 of gas flow through the propulsion assembly 1 when it is propelled.

The turbomachine 2 has a central longitudinal axis A1 around which its various components extend, in this case, from upstream to downstream, a fan 4, a low-pressure compressor 5, a high-pressure compressor 6, a combustion chamber 7, a high-pressure turbine 8 and a low-pressure turbine 9. The compressors 5 and 6, the combustion chamber 7 and the turbines 8 and 9 form a gas generator.

During operation of the turbomachine 2, an air flow 10 enters the propulsion assembly 1 via an air inlet upstream of the nacelle 3, passes through the fan 4 and then divides into a central primary flow 10A and a secondary flow 106.

The primary flow 10A flows in a main gas circulation vein 11A through the gas generator. The secondary flow 1013 flows into a secondary vein 11B surrounding the gas generator and delimited radially outwards by the nacelle 3.

Figure 2:
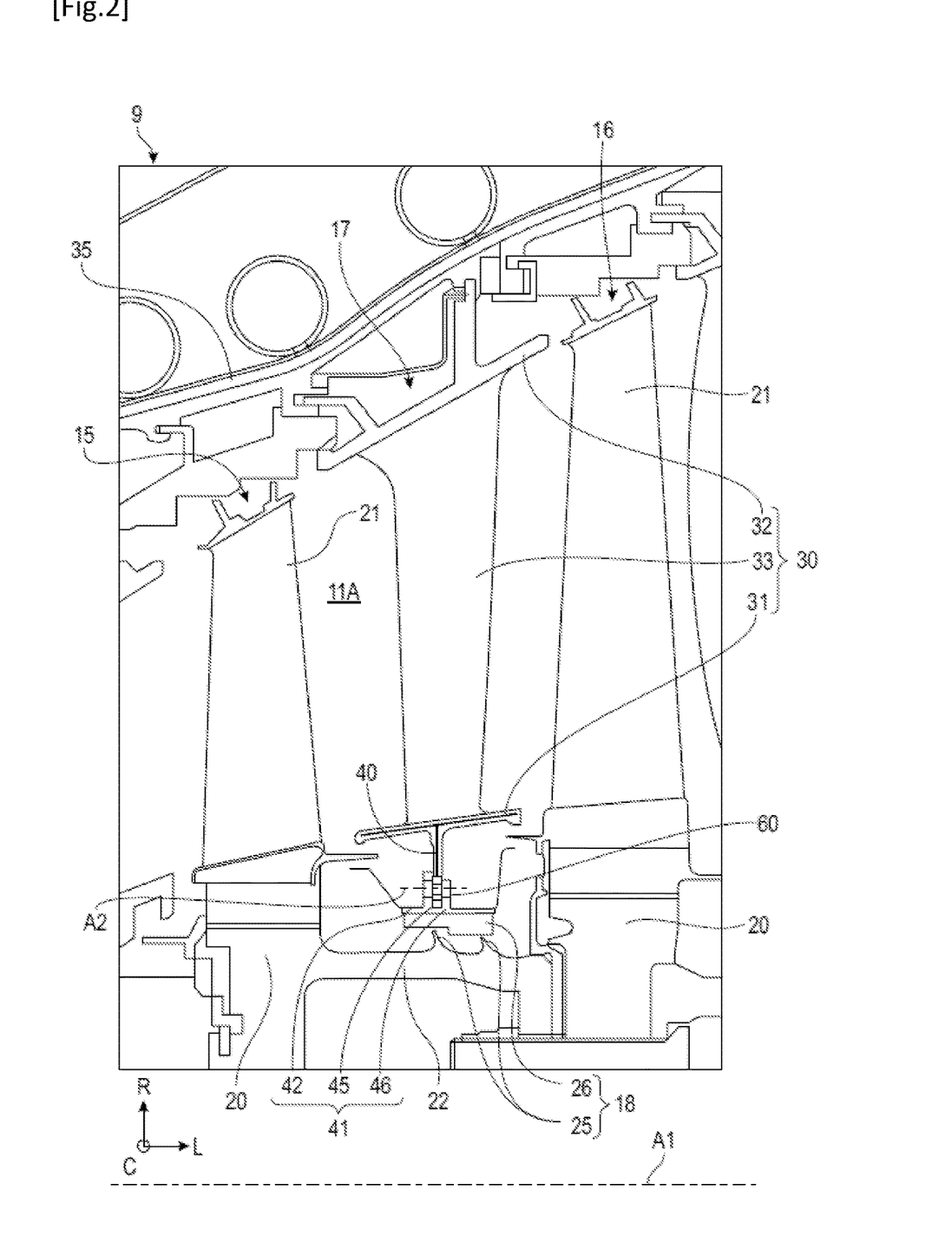
FIG. 2 is a partial schematic half-view of a low-pressure turbomachine turbine in axial cross-section.

The low-pressure turbine 9, shown in part in FIG. 2, is configured to recover some of the combustion energy in order to drive the movable wheels forming the rotor of the turbine 9 in rotation about the axis A1. Between each pair of adjacent movable wheels, the turbine 9 comprises a stator bladed ring forming a dispenser.

FIG. 2 shows a portion of two movable wheels 15 and 16, a dispenser 17 and a seal 18 of the turbine 9.

The dispenser 17 extends axially between the movable wheel 15, which forms an upstream wheel, and the movable wheel 16, which forms a downstream wheel.

In a manner known per se, each of the movable wheels 15 and 16 comprises a disc 20 and vanes 21 carried by the disc 20.

In this example, the disc 20 of the upstream wheel 15 comprises a shell 22 extending axially towards the downstream wheel 16, radially inside the dispenser 17. A downstream end of the shell 22 is connected to the disc 20 of the downstream wheel 16 so as to secure the wheels 15 and 16 together in rotation about the axis A1.

The seal 18 is formed, on the one hand, by annular lips 25 carried by the shell 22 and, on the other hand, by an abradable element 26, or wear part, connected to the dispenser 17.

During operation of the turbomachine 2, the movable wheels 15 and 16 are driven in rotation about the axis A1, and the lips 25 thus rotate opposite the abradable element 26. The seal 18 thus provides a sealing which reduces the circulation of gas outside the main vein 11A, in this case radially between the dispenser 17 and the shell 22.

In this example, the dispenser 17 comprises a number of sectors 30 arranged circumferentially end to end so that together they form a bladed ring.

Figure 3:
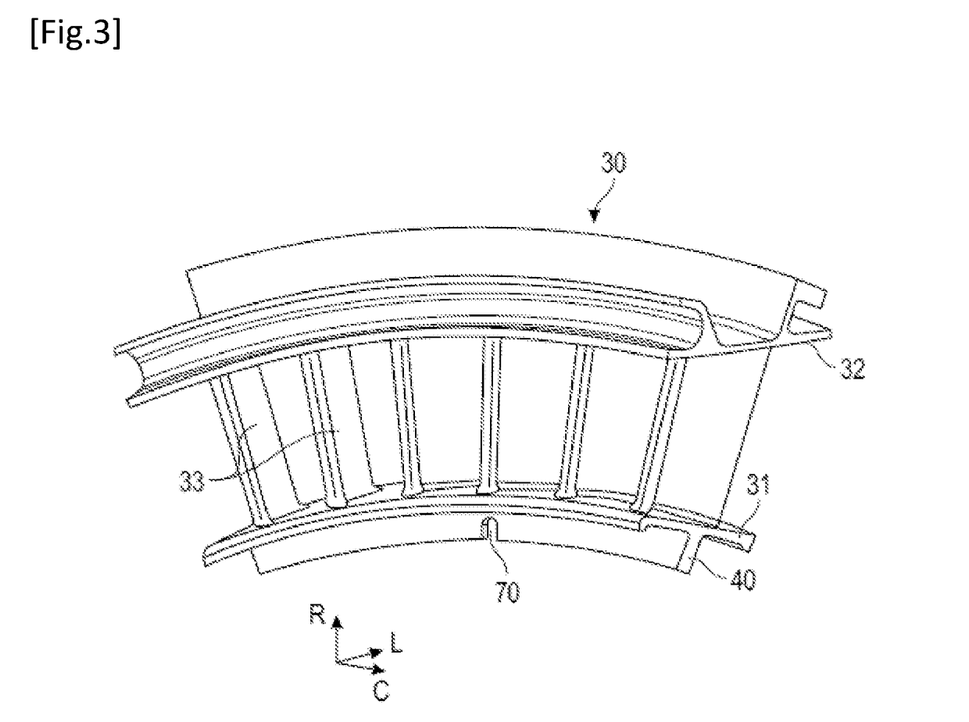
FIG. 3 is a schematic perspective view of a dispenser sector of the turbine in FIG. 2.

FIG. 3 shows one of these ring sectors 30. In this example, all the ring sectors of the dispenser 17 are identical so that the following description, which relates to the ring sector 30 of FIG. 3, applies to each of the other ring sectors.

With reference to FIGS. 2 and 3, the ring sector 30 comprises an internal platform 31, an external platform 32 and blades 33.

The blades 33 are each connected on the one hand to the internal platform 31 and on the other hand to the external platform 32 so as to extend radially across the main vein 11A, which is radially delimited by these platforms 31 and 32.

The blades 33 of the ring sector 30 are circumferentially spaced from each other. The external platform 32 is configured to be attached to a casing 35 of the turbomachine 2.

The ring sector 30 comprises a flange 40 connected to the internal platform 31 so as to extend radially inwards from the internal platform 31 towards the shell 22.

The flange 40 is configured to cooperate with a sealing annulus 41.

Figure 4:
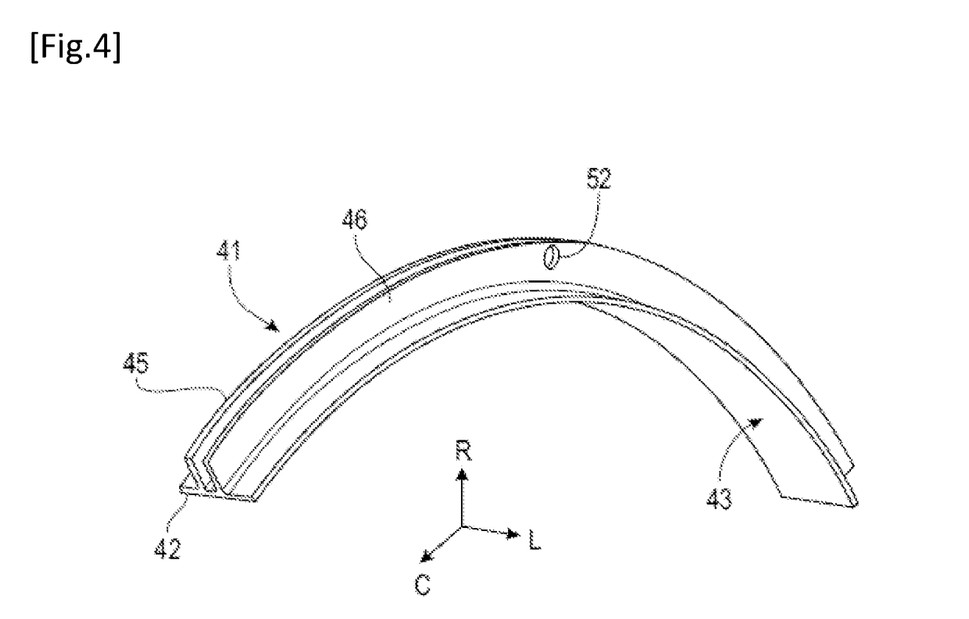
FIG. 4 is a schematic perspective view of an annulus stretch forming a support for an abradable element of a seal of the turbine of FIG. 2.

FIG. 4 shows a circumferential stretch of the annulus 41, which forms an annular ring.

The annulus 41 is in this example a part carrying the abradable element 26, which also forms an annular ring.

Figure 5:
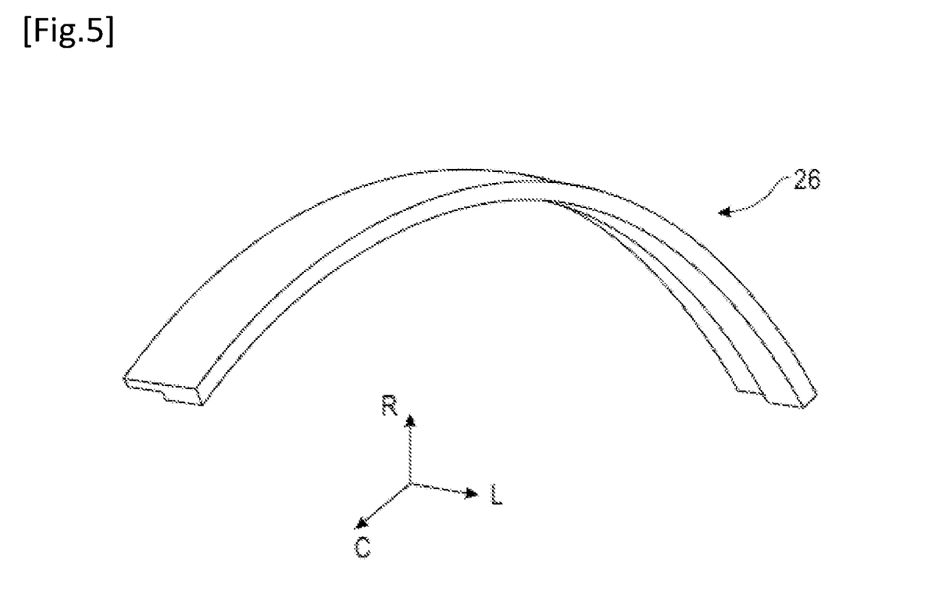
FIG. 5 is a schematic perspective view of a stretch of an annular abradable element of said seal of the turbine of FIG. 2.

With reference to FIGS. 4 and 5, which show respectively a circumferential stretch of the annulus 41 and a corresponding circumferential stretch of the abradable element 26, the annulus 41 comprises for this purpose a platform 42 defining an internal surface 43 to which the abradable element 26 is attached according to the configuration of FIG. 2.

The annulus 41 also comprises an upstream annular flange 45 and a downstream annular flange 46 extending radially outwards from the platform 42.

With reference to FIGS. 2, 4, 6 and 8, the flanges 45 and 46 are substantially parallel and axially spaced apart so as to form a U-shaped section defining a space into which the flange 40 of each of the ring sectors 30 can be inserted.

The axial distance between the flanges 45 and 46 is chosen so as to allow the ring sectors 30 to be positioned axially and maintained in their axial position, while allowing the flange 40 to move by sliding radially between the flanges 45 and 46 (see below). In particular, an axial clearance J1, J2 is left during the mounting between the flanges 40, 45, 46 to allow this radial movement (see FIG. 8). The clearance J1 extends between the flanges 45 and 40, and the clearance J2 extends between the flanges 40 and 46.

Figure 8:
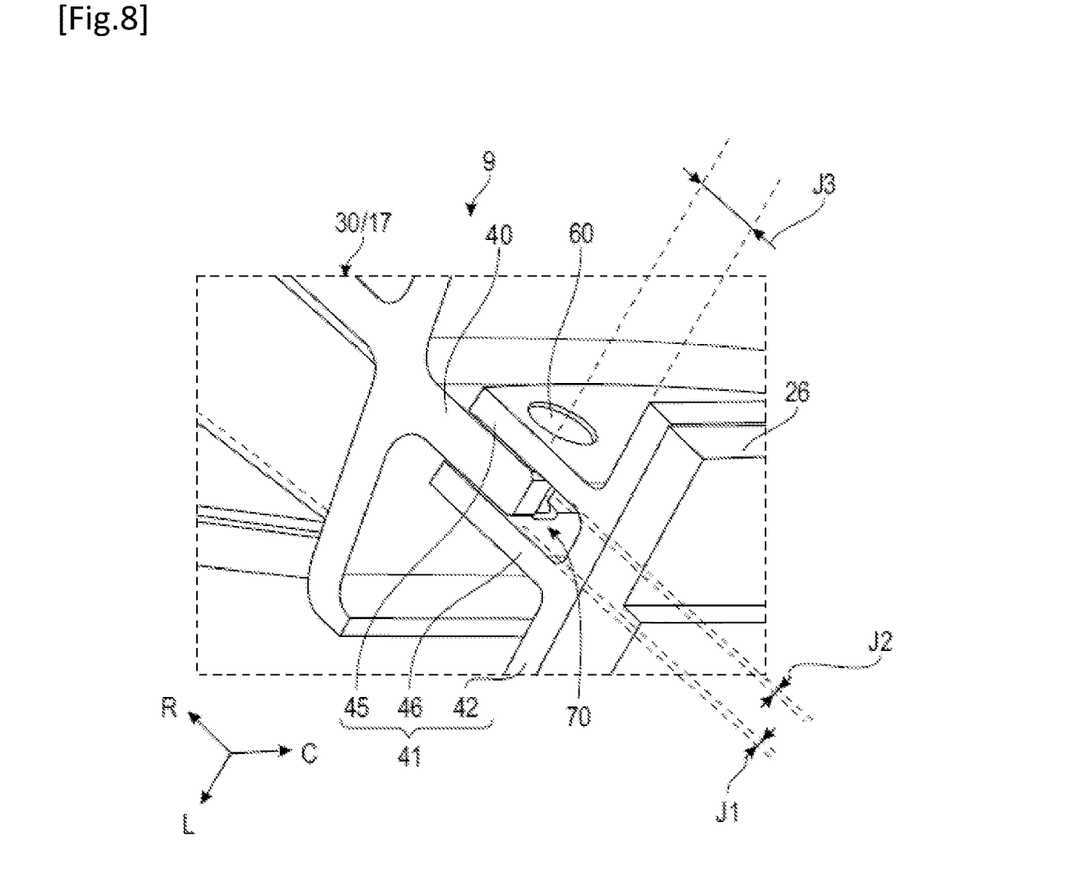
FIG. 8 is a schematic perspective view of a portion of the turbine of FIG. 2, and in particular of the radial displacement means between the annulus and a dispenser sector.

The flange 40 is also mounted with a radial clearance J3 in relation to the bottom of the space defined by the flanges 45, 46.

Figure 6:
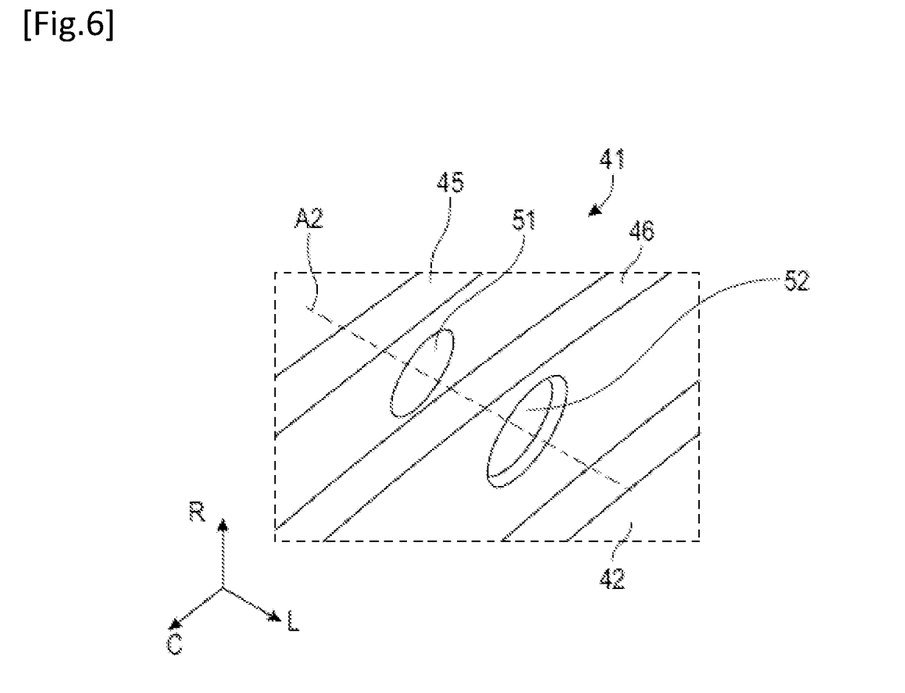
FIG. 6 is a schematic perspective view of a portion of the annulus in FIG. 4, showing orifices for receiving a pin.

FIG. 6 shows two orifices 51 and 52 made respectively in the upstream flange and the downstream flange 46 of the annulus 41.

Figure 7:
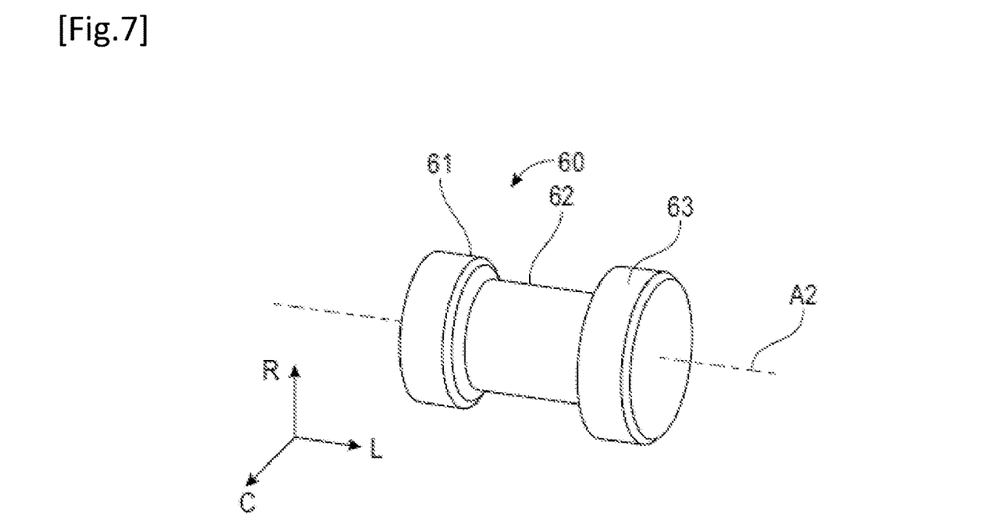
FIG. 7 is a schematic perspective view of a pin designed to ensure a cooperation of the ring sector of FIG. 3 with the annulus of FIG. 4.

The orifices 51 and 52 have a common axis A2 and are designed to receive a pin such as that shown in FIG. 7. The pin 60 is a cylindrical part with an axis A2 and two shoulders which define an upstream portion 61, an intermediate portion 62 and a downstream portion 63.

The intermediate portion 62 has a smaller diameter than the diameter of the upstream portion 61 and of the downstream portion 63. The diameter of the upstream portion 61 is also smaller than that of the downstream portion 63.

The orifice 51 in the upstream flange 45 of the annulus 41 is sized to receive the upstream portion 61 of the pin 60 so as to form an interference fit. Similarly, the orifice 52 in the downstream flange 46 of the annulus 41 is sized to receive the downstream portion 63 of the pin 60 so as to form an interference fit.

After assembly, the pin 60 is thus carried by the annulus 41, forming a complete connection with it.

The pin 60 is configured to cooperate with the dispenser 17, in particular with the flange 40 of the ring sector 30.

With reference to FIGS. 3 and 8, the flange 40 of each of the ring sectors 30 comprises an opening 70 which has an oblong shape like a radially extending groove.

In this example, the opening 70 opens radially towards the inside of the ring sector 30.

The opening 70 has a width, or circumferential dimension, allowing it to be passed through by the intermediate portion 62 of the pin 60, i.e. a width greater than the diameter of the intermediate portion 62 of the pin 60.

The width of the opening 70 is also less than the diameter of the upstream portion 61 and of the downstream portion 63 of the pin 60. Thus, if the connection between the pin 60 and the annulus 41 breaks, the flange 40 of the ring sector 30 forms an axial stop for retaining the pin 60.

In contrast to the rotor of the turbine 9, the portions of which are movable in rotation about the axis A1, the assembly formed by the annulus 41, the abradable element 26, the ring sector 30 and the pin 60 belong to the stator of the turbine 9.

Assembling this stator element involves pre-inserting the pin 60 into the annulus 41 by passing the upstream portion 61 of the pin 60 through the orifice 52 in the downstream flange 46.

The pin 60 is then attached to the annulus 41 by forced insertion of its upstream portion 61 into the orifice 51 of the upstream flange 45 and, simultaneously, of its downstream portion 63 into the orifice 52 of the downstream flange 46.

The ring sector 30 is then moved radially inwards so as to insert the flange 40 axially between the flanges 45 and 46 of the annulus 41 and to insert the intermediate portion 62 of the pin 60 into the opening 70 of the flange 40.

These assembly steps result in the configuration shown in FIGS. 2 and 8.

In this configuration, the pin 60 forms a circumferential stop for the ring sector 30, preventing the annulus 41 and the ring sector 30 from moving relative to each other in rotation about the axis A1 and allowing the annulus 41 to be centred relative to this axis A1.

Furthermore, given the respective dimensions of the intermediate portion 62 of the pin 60 and the oblong opening 70, the assembly allows a radial movement of the annulus 41 relative to the ring sector 30.

The stator assembly may comprise other pins similar to the pin 60, each cooperating with the flange 40 of a respective one of the other ring sectors 30 according to the principles described above.

Of course, these principles can be generalised. For example, each of the ring sectors 30 of the dispenser 17 can cooperate with several pins similar to the pin 60.

Generally speaking, the invention allows the sealing annulus 41 and the dispenser 17 to be connected to each other by a connection defining a radial degree of freedom capable of compensating for differential thermal expansion within the turbine 9.

The radial clearance between the lips 25 and the abradable element 26 can thus be kept substantially constant during operation of the turbojet 2, which improves the sealing provided by the seal 18.

The forced fitting of the pins 60 in the orifices 51 and 52 of the annulus 41 helps to reduce the gas leaks outside the main vein 11A.

Figure 9:
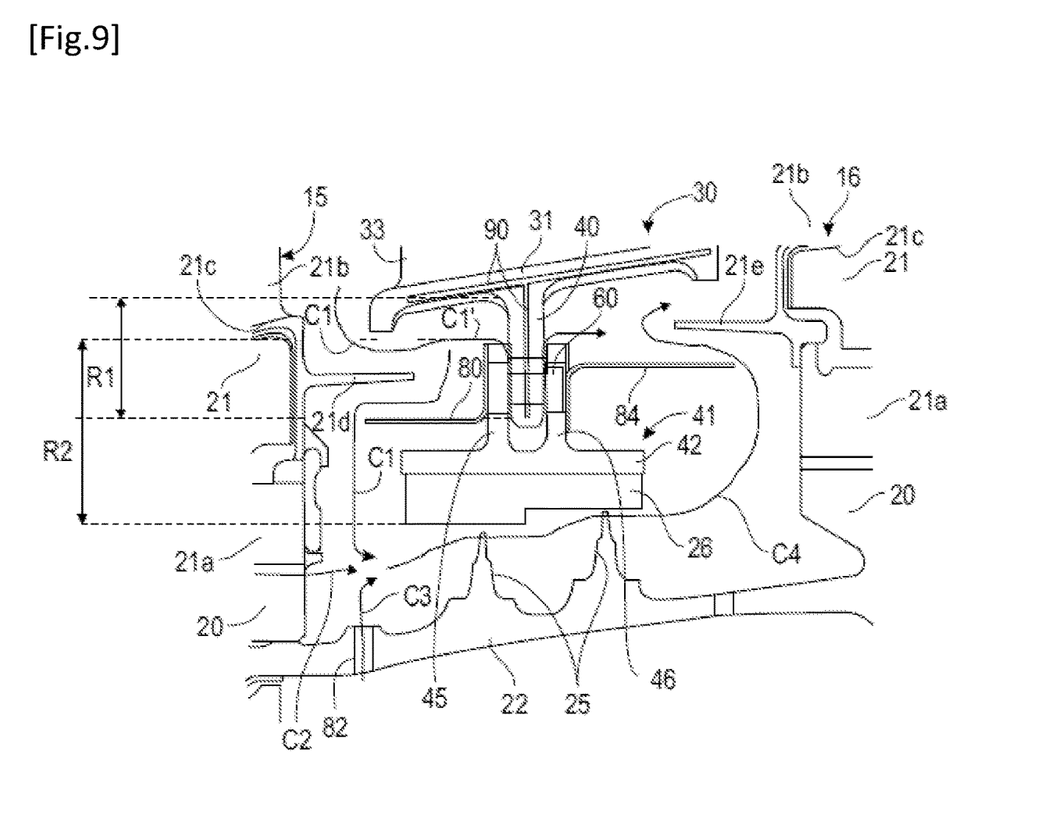
FIG. 9 is a partial schematic half-view of a low-pressure turbine in axial cross-section and illustrates the circulation of several gas flows.

FIG. 9 is a larger scale view of a sealing annulus 41 in its mounting environment.

The ring sector 30 shown in FIG. 9 comprises grooves 90 provided in the flange 40 and in the platform 31. These grooves 90 are configured to receive a first portion of sealing plates, a second portion of these plates being housed in similar grooves 90 made in an adjacent ring sector 30 so that the sealing plates extend circumferentially between these ring sectors 30 and seal the circumferential space they define between them. Such sealing plates can be arranged on this principle so as to extend circumferentially between each pair of adjacent ring sectors and so improve the sealing of the assembly.

FIG. 9 also allows to show the flowing circuits of gas flow.

A first circuit C1 represents a portion of the gases from the vein 11A which passes radially inwards, between the upstream wheel 15 and the platform 31 of each of the ring sectors 30. These gases are intended to flow radially inwards, between the upstream wheel 15 and the sealing annulus 41, as far as the lips 25. To achieve this, a deflector 80 formed by a sheet-metal can be attached to the sealing annulus 41 and in particular to its upstream flange, to guide these gases so that they bypass the abradable element 26.

However, in practice, due to the presence of the assembly clearance J1, J2, some of these gases (C1') pass through the flanges 40, 45, 46 and arrive directly downstream of the dispenser sectors, without passing through the seal. These gases are then reinjected directly into the vein 11A.

Figure 10:
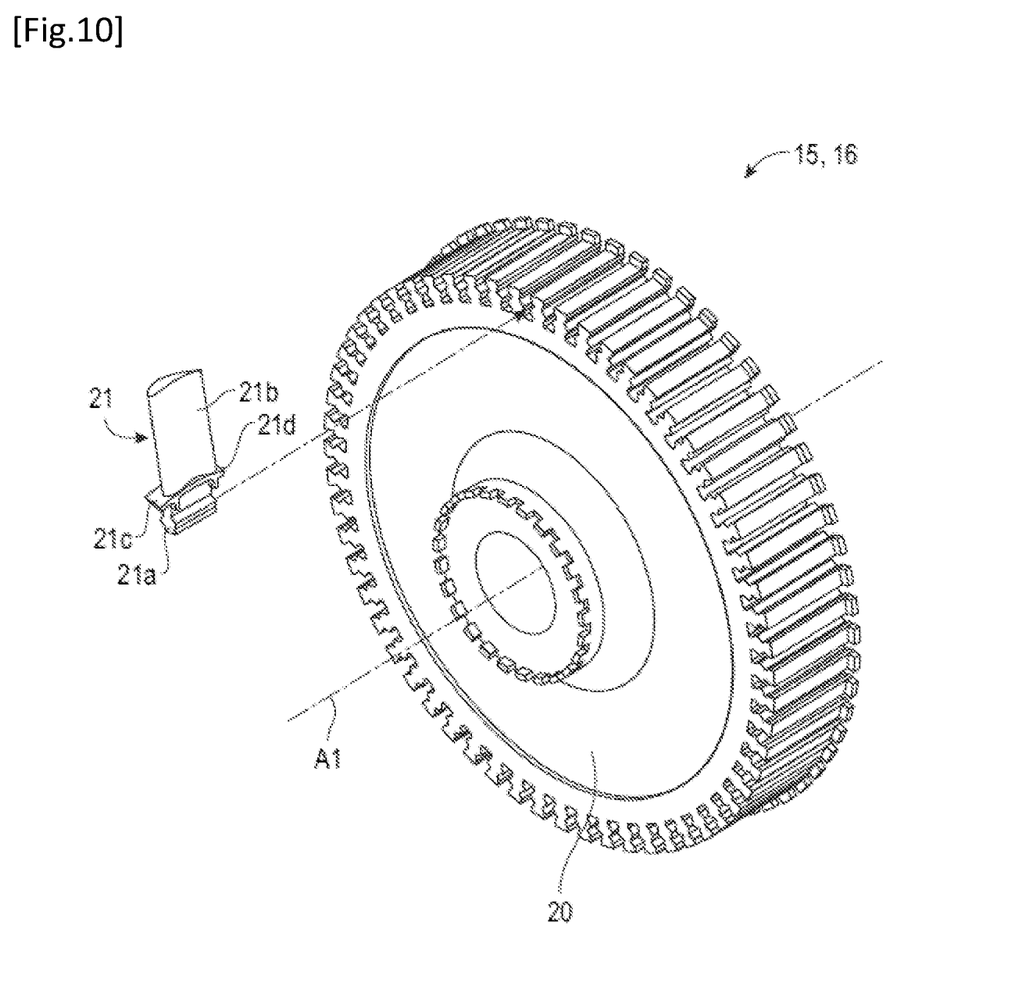
FIG. 10 is a schematic perspective view of a disc and vane of a turbine wheel.

A second circuit C2 represents ventilation air which passes through mounting clearances provided between the roots 21a of the vanes 21 and the recesses 20a of the disc 20 of the upstream wheel 15 (see FIG. 10). Each of the vanes comprises a root 21a which is connected to the blade 21b of the vane by a platform 21c. This platform 21c extends upstream of the platform 31 of the downstream dispenser sector 30 and comprises a downstream spoiler 21d. The downstream spoiler 21d extends axially downstream and its downstream end is interposed radially between the upstream end of the platform of each of the dispenser sectors 30 and the upstream end of the deflector 80.

The disc 20 of the wheel 15 comprises a series of recesses 20a at its external periphery, each of which receives the root 21a of a vane 21. The root 21a of the vanes 21 are fitted by male-female engagement into the recesses 20a and clearances persist between the root 21a and the walls of the recesses 20a, in particular between the radially internal end of each root and the bottom of the corresponding recess. These clearances allow ventilation air to pass axially from upstream to downstream of the wheel, to form the circuit C2.

A third circuit C3 represents ventilation air which passes through radial orifices 82 provided in the shell 22, upstream of the lips 25.

The various gases coming from the circuits C1, C2, C3 meet upstream of the lips and are intended to feed the seal formed by the lips 25 and the abradable element 26. These gases pass axially through this seal and end up downstream of the sealing annulus (circuit C4).

A deflector 84 formed by a sheet-metal can be attached to the sealing annulus 41 and in particular to its downstream flange 46, to guide these gases so that they join the vein 11A.

As in the case of the upstream wheel 15, the vanes 21 of the downstream wheel 16 each comprise a root 21a which is connected to the blade 21b of the vane by a platform 21c. This platform 21c extends downstream from the platform 31 of the upstream dispenser sector 30 and comprises an upstream spoiler 21e. The upstream spoiler 21e extends axially upstream and its upstream end is interposed radially between the downstream end of the platform 31 of each of the dispenser sectors 30 and the downstream end of the deflector 84.

The present invention offers a solution to prevent the mounting clearance J1, J2 from being detrimental to the circulation of the gases in this environment and having a negative impact on the operation of the seal and the performance of the turbomachine.

Figure 11:
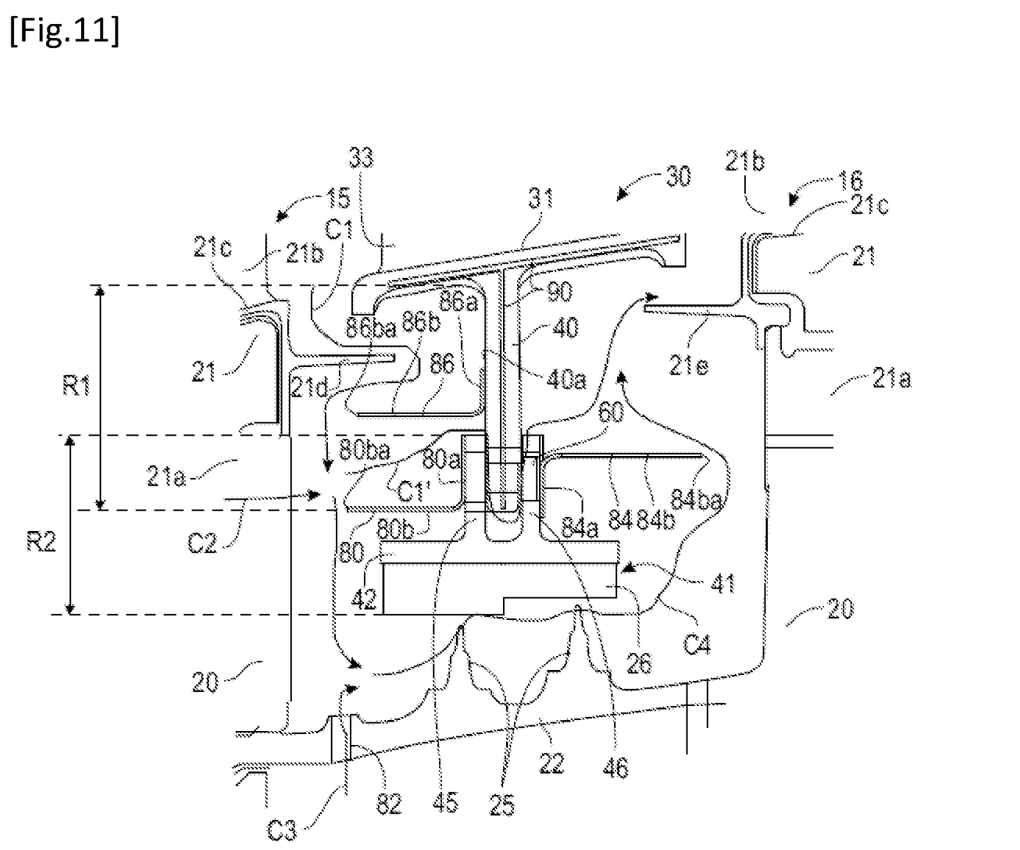
FIG. 11 is a partial schematic half-view of a low-pressure turbine in axial cross-section and illustrates the circulation of several gas flows by means of the invention.

FIG. 11 illustrates a preferred embodiment of the invention.

According to the invention, each of the ring sectors 30 comprises a deflector 86 which is carried by the internal flange 40 of this sector and extends around the upstream flange 45 of the sealing annulus 41.

In the example shown, the deflector 86 is attached to an upstream radial face 40a of the internal flange 40 of each of the ring sectors 30. The deflector 86 can be attached by welding, brazing or mechanical connection (using screws or rivets, for example).

As in the case of the ring sectors 30, the deflectors 86 carried by the ring sectors together have a generally annular shape. Taken individually, they have a generally curved or arcuate shape, the axis of revolution of which can be considered to coincide with the axis A1 of the turbine.

As can be seen in the drawing, each deflector 86 is generally L-shaped in axial cross-section, a first branch 86a of which is oriented radially and extends parallel to the internal flange 40 of each of the ring sectors 30, and a second branch 86b of which is oriented axially upstream and extends around the upstream flange 45 of the sealing annulus 41 and at least an upstream portion of this sealing annulus 41. Because of the curved shape of the deflector 86, this second branch 86b has a generally cylindrical or part-cylindrical shape.

This second branch 86b preferably comprises an upstream free end 86ba which is located:

upstream of the sealing annulus 41, and/or upstream of the downstream end of the spoiler 21d, and/or substantially in line with the upstream end of the platform 31 of the corresponding ring sector 30.

As with the other two deflectors 80 and 84 described above, the deflector 86 can be formed from sheet-metal. The deflectors 80, 86 and their sheet-metals may be similar or identical and in particular oriented in the same way, with their radial branches extending upwards. The deflector 84 may be oriented in a different position with its radial branch oriented inwards. The radial branches 80a, 84a of the deflectors 80, 84 are attached respectively to an upstream face of the upstream flange 45 and to a downstream face of the downstream flange 46.

The axial branch 80b of the deflector 80 preferably comprises an upstream free end 80ba which is located:

upstream of the sealing annulus 41, and/or upstream of the downstream end of the spoiler 21d, and/or substantially in line with the upstream end of the platform 31 of the corresponding ring sector 30, and/or
upstream of or in line with the end 86ba of the deflector 86.

The axial branch 84b of the deflector 84 preferably comprises a downstream free end 84ba which is located:
downstream of the sealing annulus 41, and/or
downstream of the upstream end of the spoiler 21e, and/or
downstream of the downstream end of the platform 31 of the corresponding ring sector 30.

A comparison of FIGS. 9 and 11 shows that the internal flange 40 of each of the ring sectors 30 in FIG. 11 has a relatively large radial dimension R1, greater than a maximum radial dimension R2 of the sealing annulus 41 (which is not the case in FIG. 9).

FIG. 11 shows that the internal flange 40 of each of the ring sectors 30 is engaged between the flanges 45, 46 of the sealing annulus 41 over a radial distance (equal to R1−R2) which represents less than 50% of the maximum radial dimension R1 of the ring sectors 30.

As can be seen in FIG. 11, the gases from the first circuit C1 are diverted by the deflector 86 and end up upstream of the sealing annulus 41. Due to the presence of this additional deflector 86 and especially its position, the temperature of the air passing through the circuit C1' is reduced by a mixing effect with the cooling air of the circuit C2.

Virtually all the gases from the circuit C1 are therefore found upstream of the lips with the ventilation air from the circuits C2 and C3. These gases pass axially through the seal, find themselves downstream of the sealing annulus (circuit C4) and are then reinjected into the vein 11A.

As in the case of the upstream wheel 15, the vanes 21 of the downstream wheel 16 each comprise a root 21a which is connected to the blade 21b of the vane by a platform 21c. This platform 21c extends downstream from the platform 31 of the upstream dispenser sector 30 and comprises an upstream spoiler 21e. The upstream spoiler 21e extends axially upstream and its upstream end is interposed radially between the downstream end of the platform 31 of each of the dispenser sectors 30 and the downstream end of the deflector 84.

Figure 12:
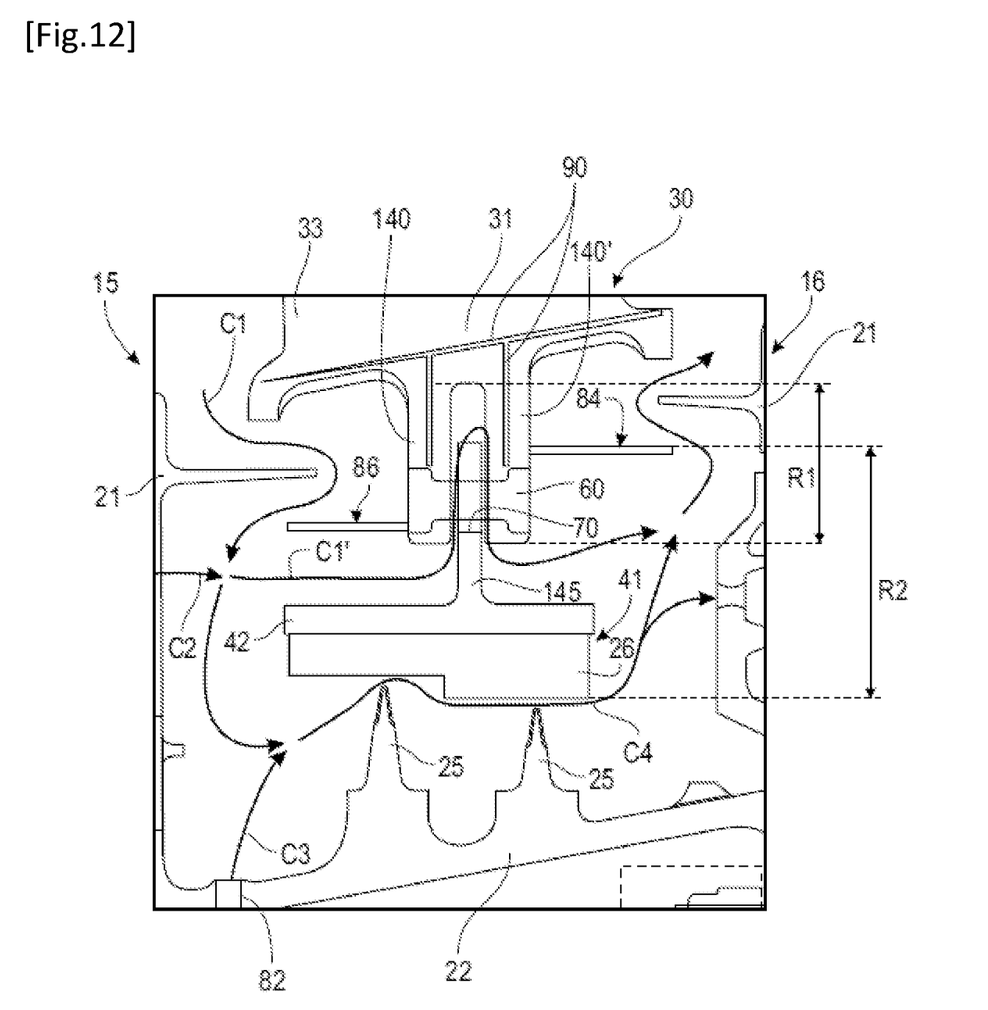
FIG. 12 is a partial schematic half-view of a low-pressure turbine in axial cross-section and shows an alternative embodiment of the invention.

FIG. 12 illustrates a variant embodiment of the invention in which the sliding means are reversed, i.e. the two upstream and downstream flanges are carried by each of the ring sectors 30 and the flange interposed between these upstream and downstream flanges is carried by the sealing annulus.

In this other configuration, therefore, the sliding means comprise two internal annular flanges 140, 140', upstream and downstream respectively, of each of the ring sectors 30, and an external flange 145 of the sealing annulus 41 which is interposed axially between the two internal flanges 104, 140'.

In this variant, each of the ring sectors 30 comprises a deflector 86 which is carried by the upstream flange 140.

In the example shown, the upstream flange 140 of each of the ring sectors 30 carries said deflector 86 at its internal periphery.

A deflector 84 can be attached to each of the ring sectors 30 and in particular to their downstream flanges 46. These deflectors 84 are located on a circumference whose diameter corresponds substantially to that of the external periphery of the external flange 145 of the sealing annulus.

The sliding means also comprise pins 60 carried by the upstream and downstream flanges 140, 140' of each of the ring sectors 30 and passing through oblong openings 70 formed in the flange of the sealing annulus 41. The deflector 86 is located radially inside these pins 60.

The flanges 140, 140' of each of the ring sectors 30 have a radial dimension R1 which is smaller than the maximum radial dimension R2 of the sealing annulus 41.

The external flange 145 of the sealing annulus 41 is engaged between the flanges 140, 140' of each of the ring sectors 30 over a radial distance R1−R2 which represents less than 50% of the maximum radial dimension R1 of the ring sectors 30.

The gases from the first circuit C1 are diverted by the deflector 86 and find themselves upstream of the sealing annulus 41. Due to the presence of this deflector 86, the temperature of the air passing through the circuit C1' is reduced by a mixing effect with the cooling air of the circuit C2.

Almost all the gases from the circuit C1 are therefore found upstream of the lips with the ventilation air from the circuits C2 and C3. These gases pass axially through the seal, end up downstream of the sealing annulus (circuit C4) and are then reinjected into the vein.

The invention claimed is:

1. A stator assembly for an aircraft turbomachine extending around an axis and comprising:
    a sealing annulus extending around the axis and comprising an abradable element designed to cooperate with sealing lips carried by a rotor mounted around the axis,
    a plurality of ring sectors arranged circumferentially end to end around the axis so as to form a ring together, each of the ring sectors being bladed,
    sliding means allowing a relative movement radially with respect to the axis between the sealing annulus and each of the ring sectors, the sliding means comprising:
        according to a first configuration, two external annular flanges, upstream and downstream respectively, of the sealing annulus, and an internal flange of each of the ring sectors which is interposed axially between the two external flanges, or
        according to a second configuration, two internal annular flanges, upstream and downstream respectively, of each of the ring sectors, and an external flange of the sealing annulus which is interposed axially between the two internal flanges,
    wherein each of the ring sectors comprises a first deflector which is carried, according to the first configuration, by the internal flange of each said sector and which extends around the upstream annular flange of the sealing annulus, and according to the second configuration, by the upstream flange, and
    wherein:
        in the first configuration, the upstream external flange of the sealing annulus comprises a sheet-metal forming a second deflector which is parallel to the first deflector carried by the internal flange of each said sector, the first and second deflectors forming a duct comprising at a downstream end, a radially oriented inlet of a clearance between the internal flange of each said sector and the upstream external flange and through which passes part of an air flow guided by the duct, the duct further comprising another inlet located at an upstream end, opposite to the downstream end, and which is positioned below downstream spoilers of a vane of a movable wheel of the rotor, the downstream spoilers extending at least partly around the first and second deflectors; and
        in the second configuration, the first deflector carried by the upstream internal flange of each said sector and a platform of the sealing annulus form a duct comprising at a downstream end a radially oriented inlet of a clearance between the external flange of the sealing annulus and the upstream internal flange of the sector, and through which passes part of an air flow guided by the duct, the duct comprising an inlet located at an upstream end opposite to the downstream end and which is positioned below downstream spoilers, of a vane of a movable wheel of the rotor, which extend at least partly around the first deflector.

2. The stator assembly according to claim 1, wherein the first deflector is attached to an upstream radial face of the internal annular flange of each of the ring sectors.

3. The stator assembly according to claim 1, wherein the first deflector is attached to the internal flange of each of the ring sectors by welding, brazing or riveting.

4. The stator assembly according to claim 1, wherein the first deflector has, in axial cross-section, a L shape, a first branch of which is oriented radially and extends parallel to the internal flange of each of the ring sectors, and a second branch of which is oriented axially upstream and extends around the upstream annular flange of the sealing annulus and at least an upstream portion of this sealing annulus.

5. The stator assembly according to claim 4, wherein said second branch comprises an upstream free end which is located upstream of the sealing annulus.

6. The stator assembly according to claim 1, wherein the first deflector is a sheet-metal.

7. The stator assembly according to claim 6, wherein the sealing annulus carrying the second deflector further comprises a sheet-metal which forms a third deflector and which is carried by the downstream external flange of the sealing annulus.

8. The stator assembly according to claim 7, wherein the sliding means additionally comprise pins carried by the upstream and downstream external flanges of the sealing annulus and passing through oblong openings formed in the flange of each of the ring sectors.

9. The stator assembly according to claim 1, wherein the internal flange of each of the ring sectors has a radial dimension ($R1$) greater than a maximum radial dimension ($R2$) of the sealing annulus.

10. The stator assembly according to claim 9, wherein:
the internal flange of each of the ring sectors is engaged between the flanges of the sealing annulus over a radial distance ($R1-R2$) which represents less than 50% of the maximum radial dimension ($R1$) of the ring sectors, or
the external flange of the sealing annulus is engaged between the flanges of each of the ring sectors over a radial distance ($R1-R2$) which represents less than 50% of the maximum radial dimension ($R1$) of the ring sectors.

11. The stator assembly according to claim 1, wherein the upstream flange of each of the ring sectors carries said first deflector at its internal periphery.

12. The stator assembly according to claim 11, wherein the sliding means additionally comprise pins carried by the upstream and downstream flanges of each of the ring sectors and passing through oblong openings formed in the flange of the sealing annulus, said deflector being situated radially inside these pins.

13. A turbine for an aircraft turbomachine, this turbine comprising a casing and a stator assembly according to claim 1 carried by the casing.

14. The turbine according to claim 13, further comprising a rotor provided with annular lips configured to cooperate with the abradable element of the stator assembly, this rotor comprising a movable wheel located upstream of the ring sectors and comprising a disc carrying vanes.

15. The turbine according to claim 14, wherein the vanes of the movable wheel comprise downstream spoilers which extend at least partly around said first deflector.

16. The turbine according to claim 15, wherein the rotor comprises a first ventilation air passage which has an axial orientation and which is defined by clearances between roots of the vanes and the disc, and a second ventilation air passage which has a radial orientation and which is defined by radial orifices formed upstream of said lips.

17. The turbine according to claim 15, wherein the downstream spoilers extend around said first deflector which itself extends around a second deflector carried by the upstream external flange of the sealing annulus.

18. The stator assembly according to claim 1, wherein the first deflector is configured to prevent an air flow located in a space between the downstream spoilers and the first deflector to enter directly in the radially oriented inlet of the clearance.

19. The stator assembly according to claim 6, wherein each of the ring sectors carrying the first deflector further comprises a sheet-metal which forms a second deflector and which is carried by the downstream internal flange of the ring sectors.

20. A stator assembly for an aircraft turbomachine extending around an axis and comprising:
a sealing annulus extending around the axis and comprising an abradable element designed to cooperate with sealing lips carried by a rotor mounted around the axis,
a plurality of ring sectors arranged circumferentially end to end around the axis so as to form a ring together, each of the ring sectors being bladed,
sliding means allowing a relative movement radially with respect to the axis between the sealing annulus and each of the ring sectors, the sliding means comprising:
according to a first configuration, two external annular flanges, upstream and downstream respectively, of the sealing annulus, and an internal flange of each of the ring sectors which is interposed axially between the two external flanges, at least the upstream flange of the sealing annulus comprising an upstream deflector or
according to a second configuration, two internal annular flanges, upstream and downstream respectively, of each of the ring sectors, and an external flange of the sealing annulus which is interposed axially between the two internal flanges,
wherein each of the ring sectors comprises a first deflector which is carried:
according to the first configuration, by the internal flange of each said sector and which extends around the upstream annular flange of the sealing annulus, said first deflector being parallel to the upstream deflector, and
according to the second configuration, by the upstream flange;
and
wherein the first deflector is configured to prevent an air flow, located in a space between downstream spoilers of a vane of a movable wheel of the rotor and the first deflector, to enter directly in a radially oriented inlet of a clearance which is defined between the internal flange of each said sector and the upstream external flange, or between the external flange of the sealing annulus and the upstream internal flange each of the sectors, the inlet being located below the first deflector.

* * * * *